United States Patent
Nieminen et al.

(10) Patent No.: US 12,343,733 B2
(45) Date of Patent: Jul. 1, 2025

(54) RECLAMATION OF WASTE SAND

(71) Applicant: Resand Oy, Nuutajärvi (FI)

(72) Inventors: Jukka Nieminen, Nuutajärvi (FI); Toni Wesin, Nuutajärvi (FI)

(73) Assignee: Resand Oy, Nuutajärvi (FI)

( * ) Notice: Subject to any disclaimer, the term of this patent is extended or adjusted under 35 U.S.C. 154(b) by 0 days.

(21) Appl. No.: 18/689,003

(22) PCT Filed: Sep. 5, 2022

(86) PCT No.: PCT/EP2022/074583
§ 371 (c)(1),
(2) Date: Mar. 4, 2024

(87) PCT Pub. No.: WO2023/031452
PCT Pub. Date: Mar. 9, 2023

(65) Prior Publication Data
US 2024/0408612 A1    Dec. 12, 2024

(30) Foreign Application Priority Data

Sep. 6, 2021  (EP) .................................. 21195006

(51) Int. Cl.
*B03B 1/02*  (2006.01)
*B03B 9/06*  (2006.01)
(Continued)

(52) U.S. Cl.
CPC ................ *B03B 1/02* (2013.01); *B03B 9/061* (2013.01); *B09B 3/35* (2022.01); *B09B 3/38* (2022.01); *B09B 3/40* (2022.01)

(58) Field of Classification Search
CPC ........... B03B 1/02; B03B 9/0061; B09B 3/35; B09B 3/38; B09B 3/40; B07B 1/24; F27B 7/00
See application file for complete search history.

(56) References Cited

U.S. PATENT DOCUMENTS

| 696,787 | A | * | 4/1902 | Acklin | ................... | G01G 19/00 |
| | | | | | | 177/60 |
| 5,524,769 | A | * | 6/1996 | Spencer | .................. | B03B 9/063 |
| | | | | | | 209/288 |
| 10,239,117 | B2 | * | 3/2019 | Suzuki | ...................... | F28C 3/18 |

FOREIGN PATENT DOCUMENTS

| GB | 2092040 A | 8/1982 |
| JP | 2017131929 A | 8/2017 |
| WO | 2019081815 A1 | 5/2019 |

OTHER PUBLICATIONS

International Search Report and Written Opinion of the ISA for PCT/EP2022/074583, mailed Nov. 28, 2022, 8 pages.
(Continued)

*Primary Examiner* — Michael McCullough
*Assistant Examiner* — Jessica L Burkman
(74) *Attorney, Agent, or Firm* — Nixon & Vanderhye PC

(57) ABSTRACT

A method for a reclamation of waste sand comprising bentonite binder, in which method it is subjected a thermal treatment to the waste sand for removing carbon and absorbed moisture from the bentonite binder in the waste sand, it is subjected a mechanical treatment to the thermally treated waste sand for mechanically separating the sand from the bentonite binder, and it is subjected a cooling effect to the sand separated from the bentonite binder. Additionally, it is introduced an apparatus for a reclamation of waste sand comprising bentonite binder, sand for a building industry product, a foundry sand, or a power plant boiler sand, and a use of reclaimed sand in a building industry product, in a foundry sand, or in a power plant boiler sand.

20 Claims, 3 Drawing Sheets

(51) Int. Cl.
    *B09B 3/35*           (2022.01)
    *B09B 3/38*           (2022.01)
    *B09B 3/40*           (2022.01)

(56)                 References Cited

OTHER PUBLICATIONS

Extended European Search Report for EP21195006.8, dated Feb. 15, 2022, 4 pages.

* cited by examiner

```
┌─────────────────────────────────────────────┐
│ subjecting a thermal treatment to the waste sand for │
│ removing carbon and absorbed moisture from the │
│ bentonite binder in the waste sand          │
└─────────────────────────────────────────────┘
                      │
                      ▼
┌─────────────────────────────────────────────┐
│ subjecting a mechanical treatment to the thermally │
│ treated waste sand for separating the sand from │
│ the bentonite binder                        │
└─────────────────────────────────────────────┘
                      │
                      ▼
┌─────────────────────────────────────────────┐
│ subjecting a cooling effect to the sand separated from │
│ the bentonite binder                        │
└─────────────────────────────────────────────┘
```

FIG. 5

RECLAMATION OF WASTE SAND

CROSS-REFERENCE TO RELATED APPLICATIONS

This application is the U.S. national phase of International Application No. PCT/EP2022/074583 filed Sep. 5, 2022, which designated the U.S. and claims priority to EP 21195006.8 filed Sep. 6, 2021, the entire contents of each of which are hereby incorporated by reference.

FIELD OF THE INVENTION

The invention relates to a method and apparatus for reclamation of waste sand comprising bentonite binder.

BACKGROUND OF THE INVENTION

In prior art methods, waste sand comprising bentonite binder, such as sand used at a foundry, has been reclaimed thermally by using a so-called fluidised-bed boiler in which a powerful air stream is fed upwards from a bottom part of a furnace of the boiler. The air stream causes the waste sand to be cleaned, ash, and fuel used for heating to float in the furnace of the boiler.

An advantage of the reclamation of the waste sand is that a need for virgin natural sand may be decreased. The drawbacks of the fluidised-bed boiler-base reclamation process described are, however, a slow process, high operating costs, and high wastage per each ton of cleaned, reclaimed sand.

Examined in the ecological sense, it would be worthwhile to develop a reclamation process so that the need for virgin natural sand may further be reduced and the consumption of energy used in the reclamation process may be decreased.

BRIEF DESCRIPTION OF THE INVENTION

An object of the present invention is to provide a novel method and apparatus for the reclamation of waste sand comprising bentonite binder, as well as cleaned sand applicable to be reused in building industry products or as a foundry sand.

The invention is characterized by the features of the independent claims.

The invention is based on the idea of combining the thermal treatment effect and the mechanical treatment effect to be subjected to the waste sand comprising bentonite binder for reclaiming the sand for further use.

An advantage of the invention is a reduced energy consumption and increased yield of the cleaned, reclaimed sand.

Some embodiments of the invention are disclosed in the dependent claims.

BRIEF DESCRIPTION OF THE DRAWINGS

In the following the invention will be described in greater detail by means of preferred embodiments with reference to the accompanying drawings, in which

FIG. 5 shows schematically an embodiment of a method for reclamation of waste sand comprising bentonite binder.

For the sake of clarity, the figures show some embodiments of the invention in a simplified manner. Like reference numerals identify like elements in the figures.

DETAILED DESCRIPTION OF THE INVENTION

Figure 1:
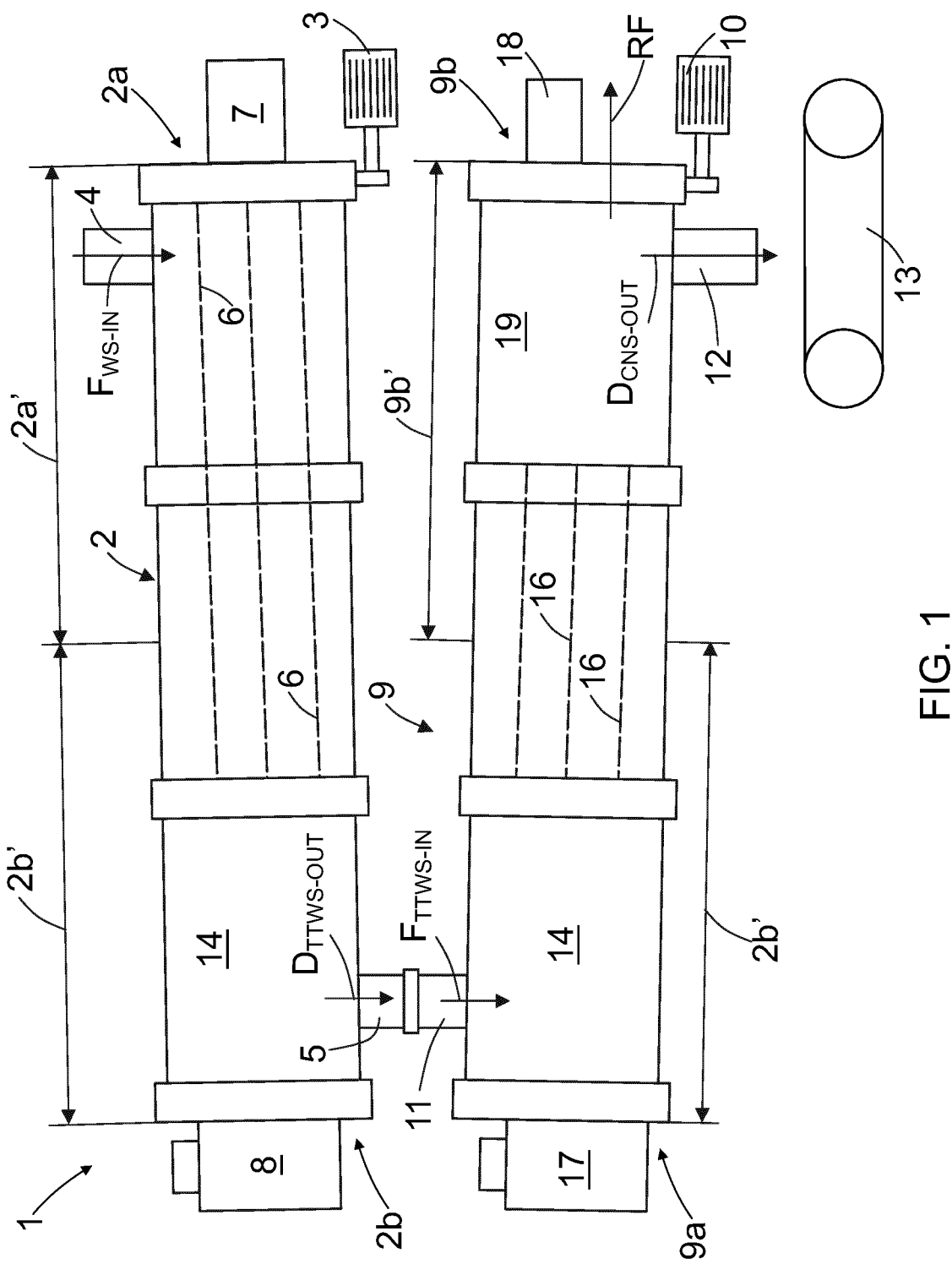
FIG. 1 shows schematically a side view of an embodiment of an apparatus for reclamation of waste sand comprising bentonite binder.

FIG. 1 shows schematically a side view of an embodiment of an apparatus 1 for a reclamation of waste sand comprising bentonite binder. The waste sand comprising bentonite binder thus consists of grains of sand with a layer of bentonite binder on a surface of the grains of sand. The waste sand comprising bentonite binder may originate for example from a foundry wherein it was used in casting, or from a power plant wherein it was used as a bed material in a fluidised-bed boiler.

Figure 2:
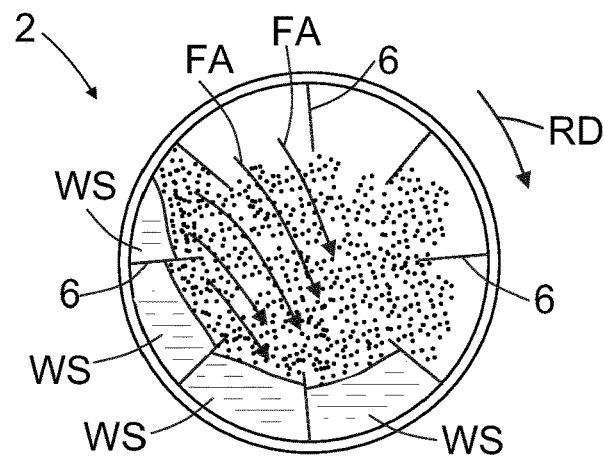
FIG. 2 shows schematically an end view of a part of the apparatus of FIG. 1.

The apparatus 1 comprises a rotatable oven 2 which is heated for subjecting a thermal treatment effect to the waste sand comprising bentonite binder for removing carbon and absorbed moisture from the bentonite binder in the waste sand. FIG. 2 shows schematically an end view of the oven 2 of FIG. 1. The oven 2 is arranged to be rotated by at least one rotating motor 3 for example in the rotation direction indicated in FIG. 2 by an arrow denoted with the reference sign RD.

The rotatable oven 2 has a generally cylindrical shape and it comprises a first end 2a and a second end 2b at the end opposite to the first end 2a, the direction between the first end 2a and the second end 2b of the oven 2 defining a longitudinal direction of the oven 2. The oven 2 comprises a first end portion 2a' extending from the first end 2a towards the second end 2b, in the embodiment of FIG. 1 substantially up to a middle part of the oven 2 in the longitudinal direction thereof, the first end portion 2a' thus also including the first end 2a of the oven 2. The oven 2 further comprises a second end portion 2b' extending from the second end 2b towards the first end 2a, in the embodiment of FIG. 1 substantially up to the middle part of the oven 2 in the longitudinal direction thereof, the second end portion 2b' thus also including the second end 2b of the oven 2. The oven 2 has at the first end 2a or at the first end portion 2a' at least one inlet 4 for feeding the waste sand into the oven 2 as shown with the arrow indicated with the reference sign $F_{WS-IN}$, and at the second end 2b or at the second end portion 2b' at least one outlet 5 for discharging the waste sand, that was subjected to the thermal treatment in the oven 2, i.e., the thermally treated, i.e., heat-treated, waste sand comprising bentonite binder, out of the oven 2 for further processing, as shown with the arrow indicated with the reference sign $D_{TTWS-OUT}$. An inner volume of the drum 2 is thus at least partly open substantially from the first end 2a of the oven 2 substantially up to the second end 2b thereof for the flow of the waste sand therein.

At the inner circumference of the rotatable oven 2, at least at some part of the first end portion 2a' of the rotatable oven 2, there are a number of lifters 6, i.e., one or more lifters 6, that extend(s) from the inner circumference of the rotatable oven 2 towards a central part thereof, as shown schematically in FIG. 2. In FIG. 1 the lifters 6 are illustrated very schematically with broken lines denoted with the reference sign 6. In a longitudinal direction of the oven 2 the at least one lifter 6 is arranged to extend substantially from the first end 2a of the oven 2 towards the second end 2b of the oven 2. The at least one lifter 6 may extend up to the second end portion 2b' of the oven 2, as schematically shown in FIG. 1, and even up to the second end 2b of the oven 2.

The at least one lifter 6 is arranged to capture at least a portion of the waste sand fed into the oven 2 to move with the oven 2 on the inner circumference of the oven 2 until falling back towards a bottom of the oven 2, in a manner disclosed schematically with arrows indicated with the reference signs FA in FIG. 2. When the waste sand falls towards the bottom of the oven 2, the falling waste sand, i.e., grains of the waste sand, forms during the fall a kind of a sand cloud inside the oven 2, denoted with a set of numerous dots shown schematically in FIG. 2. Layers of waste sand between the lifters 6 are illustrated very schematically and denoted with the reference sign WS.

In the embodiment of FIG. 1 the lifters 6 are in inclined positions such that an end of the lifter 6 facing towards the first end 2a of the oven 2 is at a higher position relative to an opposite end of the lifter 6 facing towards the second end 2b of the oven 2. The effect of this is to guide and enhance a travel of the waste sand in the oven 2 from the first end 2a of the oven 2 towards the second end 2b thereof. Similar effect may be achieved or intensified by arranging the oven 2 in an inclined position such that the first end 2a of the oven 2 is at a higher position relative to the second end 2b of the oven 2, as shown schematically in the embodiment of FIG. 1 too.

Furthermore, in the apparatus of FIG. 1, there is at least one burner 7 at the first end 2a of the oven 2. Alternatively, if applicable, the burner 7 could be arranged in the inner volume of the oven 2 at an area in the first end portion 2a' of the oven 2. The burner 7 is arranged to heat the inner volume of the oven 2 and the waste sand fed into the oven 2. The burner 7 may for example be a gas burner, condensed gas burner or any other burner or some other heating means applicable to heat the inner volume of the oven 2 and the waste sand fed into the oven 2.

Furthermore, in the apparatus of FIG. 1, there is at least one air exhauster 8 at the second end 2b of the oven 2. Alternatively, if applicable, the air exhauster 8 could be arranged in the inner volume of the oven 2 at an area in the second end portion 2b' of the oven 2. The air exhauster 8 is arranged to discharge flue gases and fines, such as dust, appearing in the inner volume of the oven 2 out of the oven 2. The air exhauster 8 may be replaced with other means applicable to discharge flue gases and fines out of the oven 2.

The oven 2 and the equipment relating thereto are operated as follows.

The waste sand comprising bentonite binder is fed into the oven 2 through the at least one inlet 4, as shown schematically in FIG. 1 with the arrow $F_{WS-IN}$. The waste sand is fed into the oven 2 such that it preferably falls towards the bottom of the oven 2 through a flame of the burner 7, whereby a heating of the waste sand is initiated effectively.

At the same time the oven 2 is rotated by the rotating motor 3, whereby the at least one lifter 6 is arranged to capture at least a portion of the waste sand fed into the oven 2 to move with the oven 2 on the inner circumference of the oven 2 until falling back towards a bottom of the oven 2, the grains of sand thereby forming the sand cloud inside the oven 2. The formation of this sand cloud allows the waste sand to be heated substantially uniformly in the volume of the oven 2. The burner 7 is rated and operated to heat the waste sand in such a manner that a temperature of at least about 400° C. of the waste sand, preferably a temperature of at least about 400-700° C. of the waste sand is achieved. A temperature sensor for measuring the temperature of the waste sand inside the oven 2 may be applied to control a heating efficiency of the burner 7 and/or a rotation speed of the oven 2, which effects both on the formation of the sand cloud in the inner volume of the oven 2 and a speed of a propagation of the waste sand in the oven 2, to verify that a desired temperature of the waste sand in the oven 2 may be achieved.

The heating of the waste sand subjects a thermal treatment to the waste sand in the oven and it has the effect that the absorbed moisture is evaporated away from the bentonite binder. When the absorbed moisture is evaporated away from the bentonite binder, it is easier to detach the bentonite binder away from the surfaces of the grains of sand by a mechanical treatment subjected to the waste sand, which is considered in more detail below.

At the same time the rotation of the oven 2, causing at least a portion of the waste sand to be captured by at least one lifter 6 from moving the waste sand with the oven 2 on the inner circumference of the oven 2 until it falls back towards the bottom of the oven 2, causing a light mechanical treatment effect to be subjected to the heated waste sand by impacts to be subjected to the grains of sand due to the fall thereof to the bottom of the oven 2. This light mechanical treatment effect has the effect that dust containing carbon is detached from the bentonite binder. The carbon detached from the bentonite binder is combusted due to the temperature in the oven 2, what reduces the amount of dust generated in the process.

The fines, such as dust, generated in the oven 2 or entered the oven 2 for example with the waste sand is discharged out of the oven 2 by the air exhauster 8. The waste sand having been subjected to the thermal treatment effect in the oven 2 is further discharged out of the oven 2 through the at least one outlet 5, as shown schematically, as shown with the arrow indicated with the reference sign $D_{TTWS-OUT}$, for a mechanical treatment effect to be subjected to the waste sand as discussed below.

The apparatus 1 of FIG. 1 further comprises a rotatable drum 9 for subjecting a mechanical treatment effect to the thermally treated, i.e., heat-treated, waste sand received from the rotatable oven 2 for separating the sand, i.e., grains of sand, from the bentonite binder in the waste sand. The drum 9 is arranged to be rotated by at least one rotating motor 10.

The rotatable drum 9 has a generally cylindrical shape and it comprises a first end 9a and a second end 9b at the end opposite to the first end 9a, the direction between the first end 9a and the second end 9b of the drum 9 defining a longitudinal direction of the drum 9. The drum 9 comprises a first end portion 9a' extending from the first end 9a towards the second end 9b and substantially up to a middle part of the drum 9 in the longitudinal direction thereof, the first end portion 9a' thus including the first end 9a of the drum 9. The drum 9 further comprises a second end portion 9b' extending from the second end 9b towards the first end 9a and substantially up to the middle part of the drum 9 in the longitudinal direction thereof, the second end portion 9b' thus including the second end 9b of the drum 9. The drum 9 has at the first end 9a or at the first end portion 9a' at least one inlet 11 for feeding the thermally treated waste sand from the rotatable oven 2 into the rotatable drum 9 as shown with the arrow indicated with the reference sign $F_{TTWS-IN}$, and at the second end 9b or at the second end portion 9b' at least one outlet 12 for discharging the sand separated from the bentonite binder, i.e., reclaimed clean sand, out of the drum 9, as shown with the arrow indicated with the reference sign $D_{CNS-OUT}$. The apparatus 1 may further comprise a conveyor, such as a belt conveyor 13 or a screw conveyor, to convey the reclaimed clean sand for further processing which may for example include a packaging of the reclaimed sand.

Figure 3:
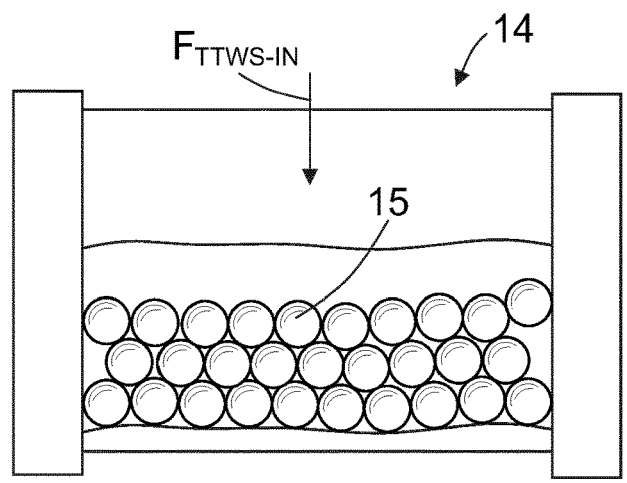
FIG. 3 shows schematically a side view of a part of the apparatus of FIG. 1 as partially cut open.

The rotatable drum 9 comprises, at least at the first end portion 9a', at least one section 14 for subjecting a mechanical treatment effect to the thermally treated waste sand for mechanically separating the sand, i.e., the grains of sand, from the bentonite binder in the waste sand. FIG. 3 shows schematically a side view of a part of the rotatable drum 9 as partially cut open at the section 14 for subjecting the mechanical treatment effect to the waste sand. In the embodiment of FIG. 3 the section 14 is a grinding section comprising grinding balls 15 subjecting impacts to the waste sand for separating the sand from the bentonite binder when the drum 9 is rotated by the rotating motor 10. The section 14 thus provides mechanical treatment means applicable for subjecting a mechanical treatment effect to the thermally treated waste sand for separating the sand from the bentonite binder. The impacts subjected to the grains of sand, as well as mutual abrasion of the grains of sand, cause the bentonite binder to detach from the surfaces of the grains of sand, forming a cloud of dust including bentonite binder and other fines at the grinding section 14 in the drum 9.

According to an embodiment of the apparatus, at least one similar section may also be arranged in the rotatable oven 2, at least at the second end portion 2b' thereof, as schematically indicated in FIG. 1 also with the reference sign 14 located at the second end portion 2b' of the rotatable oven 2.

At the inner circumference of the rotatable drum 9, at least at some part of at least one of the first end portion 9a' or the second end portion 9b' of the rotatable drum 9, there may be a number of lifters 16, i.e., one or more lifters 16, that extend(s) from the inner circumference of the rotatable drum 9 towards a central part thereof, in a way similar to that discussed above in connection with the rotatable oven 2 and FIG. 2. In FIG. 1 the lifters 16 are illustrated very schematically with broken lines denoted with the reference sign 16.

The at least one lifter 16 in the rotatable drum 9 is arranged to capture at least a portion of the sand in the drum 9 to move with the drum 9 on the inner circumference of the drum 9 until falling back towards a bottom of the drum 9, in the similar manner as disclosed schematically with arrows indicated with the reference signs FA in FIG. 2. When the sand falls towards the bottom of the oven 2, the falling sand separated from the bentonite binder, i.e., grains of the sand where-from the bentonite binder has been detached, as well as fines including for example the bentonite binder detached from the sand and other dust, forms a kind of a cloud inside the drum 9, in a way like that discussed above in connection with the rotatable oven 2 and FIG. 2.

In the embodiment of FIG. 1 the lifters 16 are also in inclined positions such that an end of the lifter 16 facing towards the first end 9a of the drum 9 is at a higher position relative to an opposite end of the lifter 16 facing towards the second end 9b of the drum 9 for intensifying the travel of the sand in the drum 9 in the longitudinal direction of the drum 9. Similar effect may be achieved or intensified by arranging the drum 9 in an inclined position such that the first end 9a of the drum 9 is at a higher position relative to the second end 9b of the drum 9, as also shown schematically in the embodiment of FIG. 1.

Furthermore, in the apparatus of FIG. 1, there is at least one air exhauster 17 at the first end 9a of the drum 9. Alternatively, if applicable, the air exhauster 17 could be arranged in a volume of the drum 9 at some other portion of the first end portion 9a' of the drum 9. The air exhauster 17 is arranged to cause an air flow inside the drum 9, the direction of the air flow being from the direction of the second end 9b of the drum 9 towards the first end 9a of the drum 9, the air flow causing the cooling of the sand, i.e., the grains of sand, separated from the bentonite binder. At the same time the air exhauster 8 may discharge fines, such as dust, from the inner volume of the drum 9 out of the drum 9 along with this air flow intended to cool down the sand separated from the bentonite binder.

The air exhauster 17 thus provides one kind of cooling means for cooling the sand separated from the bentonite binder by a non-heated air flow through the inner volume of the drum 9. The non-heated air flow enters the drum 9 through at least one air inlet 18 arranged at the second end 9b of the drum 9 or at some other portion of the second end portion 9b' of the drum 9 to allow the cooling air to flow into the drum 9 from the ambient air. The driving output of the air exhauster 17 is controlled such that fines including bentonite binder detached from the grains of sand and other dust, but not sand separated from the bentonite binder, may be removed out of the drum 9 along with the cooling air flow flowing through the drum 9. In the event of there being specifically cooled air available in the ambient of the apparatus 1, that cooled air may also be used for the non-heated air flow through the inner volume of the drum 9.

Figure 4:
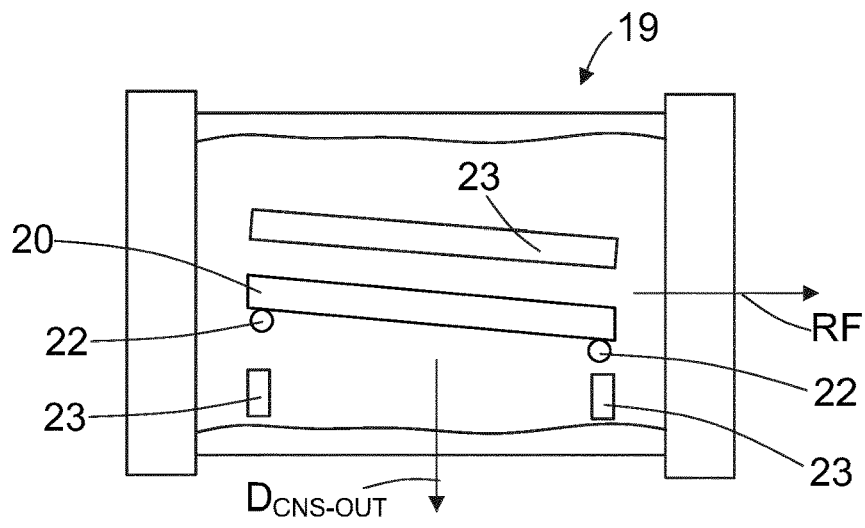
FIG. 4 shows schematically a side view of a part of the apparatus of FIG. 1 as partially cut open.

Furthermore, in the apparatus of FIG. 1, there is at the second end portion 9b' of the drum 9 at least one section 19 comprising at least one classifying apparatus 20 for classifying the sand separated from the bentonite binder to at least one accept fraction to be discharged out of the rotating drum 9 through the at least one outlet 12 of the drum 9 as cleaned, reclaimed sand $D_{CNS-OUT}$, and to at least one reject fraction RF to be discharged out of the drum 9 for further treatment, the flows of the cleaned reclaimed sand $D_{CNS-OUT}$ and reject fraction RF being schematically indicated with respective arrows in FIGS. 1 and 4. Referring to FIG. 4, wherein it is schematically shown a side view of the section 19 of the drum 9 of FIG. 1 as partially cut open, it is shown a mesh 21 provided with shakers 22, by means of which the mesh 21 may be shaken. Herein the mesh 21 thus forms a kind of classifying apparatus 20. As defined by the mesh size of the mesh 21, at least a portion of the sand, i.e., grains of sand smaller than or equal to a determined grain size, are separated or filtered from the sand processed in the drum 9 through openings in the mesh 21 for forming the accept fraction $D_{CNS-OUT}$. This accept fraction, i.e., the cleaned reclaimed sand, may then be reused in various applications as discussed later below.

Furthermore, in the apparatus of FIG. 1, there is at the mesh 21 one or more magnetic separators 23, in the embodiment of FIG. 3, three magnetic separators 23, for removing magnetic particles, such as iron and steel particles, from the sand separated from the bentonite binder. In the arrangement of FIG. 4 there is one magnetic separator 23 above the mesh 21 and two magnetic separators 23 below the mesh 21, at the ends of the mesh 21 but the arrangement of the mesh 21 and the magnetic separators 23 may vary from that.

The portion of the sand entered the mesh 21 but not having passed therethrough provides the reject fraction RF to be discharged out of the drum 9 for reject treatment. In practice, the reject fraction RF is also sand, or consists of grains of sand separated from the bentonite binder but having a grain size not passing through the openings in the mesh 21. The reject treatment may include, for example, classifying the reject fraction RF into further fractions of different grain sizes.

The solution disclosed provides a combination of the thermal treatment effect and the mechanical treatment effect to be subjected to the waste sand comprising bentonite binder for reclaiming the sand for further use. After the thermal treatment being subjected to the waste sand comprising bentonite binder, the bentonite binder is easier to detach from the surface of the grains of sand by the mechanical treatment subjected to the grains of sand. The disclosed method and apparatus provide a continuous process, wherein operating conditions remain substantially constant but can of course also be adjusted in response to a variation in quality of the waste sand to be reclaimed. The adjustable factors may for example be at least one the heating efficiency of the burner 7, the rotation speed of the oven 2, or the driving output of the air exhauster 17 but also any other factor relating to the operation of some equipment in the process and evidently affecting to the operation of the process may be determined to be an adjustable factor of the process.

Considering in more detail for example the sand used at the foundry, the sand closest to the molten metal in the casting process is exposed to very high heat (>1400° C.). At high temperatures, bentonite loses all its crystal water, and is said to be burnt bentonite which cannot reabsorb water. In many sand cycles, new layers of clay, which have lost their crystalline water, are formed on top of the burnt sand grains, and the sand is said to be oolitized.

Thermal methods alone are not effective for the regeneration of oolitized sand grains. At high temperatures, the same phenomenon occurs as in the heat of the casting event, i.e., the active bentonite burns to the surface of the sand grains. Although the burnt bentonite is brittle, heat alone is not sufficient to break the bond between the sand grain and bentonite, so even after thermal regeneration, mechanical treatment to provide sufficient mechanical impacts to the waste sand to be processed is required.

The thermal-mechanical method disclosed herein greatly enhances regeneration, as the longer time at high temperature ensures that most of the bentonite bound to the sand is burnt, so that it no longer has the capacity to resist mechanical shocks to break to bond between the sand grain and bentonite.

The mechanical treatment provides an effective way mechanically remove the bentonite binder from the waste sand after the absorbed moisture is evaporated from the bentonite binder. The total amount of energy used in the reclamation process is smaller than for example in the fluidised-bed boiler-based reclamation processes because in the disclosed solution the thermal treatment is not intended to detach the bentonite binder away from the grains of sand but only to improve the efficiency of the mechanical treatment stage. The mechanical treatment, in turn, allows an increase in the yield of the cleaned, reclaimed sand when compared to the fluidised-bed boiler-based reclamation processes.

In the embodiment of FIG. 1, the rotating drum 9 is arranged below the rotating oven 2 substantially parallel with the rotating oven 2 in a horizontal direction. This embodiment provides a compact combination of oven 2 and drum 9 which is also, depending on the size of the oven 2 and the size of the drum 9, easy to implement on a chassis provided with wheels, thereby allowing an easy mobility of the combination of the oven 2 and the drum 9, if necessary. Other arrangement of the oven 2 and the drum 9 relative to each other are, however, possible.

According to an embodiment, the apparatus comprises at least one crusher, breaker or sieve to crush, break or remove possible lumps appearing in the waste sand to be fed into the oven 2.

According to an embodiment, the apparatus comprises a heat recovery unit for recovering heat from the air flow removed from the at least one of the oven 2 or the drum 9 by the at least one air exhauster 8, 17. The recovered heat may for example be used for drying or pre-heating the waste sand to be fed into the oven 2.

According to an embodiment, the reclaimed sand may be reused as a foundry sand or a power plant boiler sand, either as such or as mixed with virgin natural sand. The reclaimed sand may then be coated again with a binder appropriate for the specific use.

According to an embodiment, the reclaimed sand may be used in a building industry product, such as in a concrete product, mortar, floor mass product, filler, float, acrylic mass, or as a filter sand. Because of a rounded structure of the grains of sand, the reclaimed sand is even more suitable to be used in building industry products than virgin natural sand, because of being able to provide more even surfaces due to the rounded form thereof. The use of the reclaimed sand in the building industry products further reduces the need for the virgin, natural sand.

It will be obvious to a person skilled in the art that, as the technology advances, the inventive concept can be implemented in various ways. The invention and its embodiments are not limited to the examples described above but may vary within the scope of the claims.

The invention claimed is:

1. A method for a reclamation of waste sand comprising bentonite binder, the method comprising:
    subjecting a thermal treatment to the waste sand for removing carbon and absorbed moisture from the bentonite binder in the waste sand,
    subjecting a mechanical treatment to the thermally treated waste sand for mechanically separating the sand from the bentonite binder, and
    subjecting a cooling effect to the sand separated from the bentonite binder, wherein the method is carried out by an apparatus comprising:
    a rotating oven having a first end portion and a second end portion and at the first end portion at least one inlet configured to feed the waste sand into the oven and at the second end portion at least one outlet configured to discharge thermally treated waste sand out of the oven,
    a burner at the first end portion of the rotating oven configured to heat the waste sand fed into the oven to subject thermal treatment to the waste sand to burn carbon and evaporate absorbed moisture away from the bentonite binder,
    at least one lifter arranged to capture at least a portion of the waste sand fed into the oven to move with the oven on an inner circumference of the oven until the sand falls back towards a bottom of the oven, the at least one lifter also being arranged to guide the travel of the waste sand in the oven towards the second end portion of the oven and the at least one outlet at the second end portion of the oven,
    a rotating drum having a first end portion and a second end portion and at the first end portion at least one inlet configured to receive the at least thermally treated waste sand into the rotating drum and at the second end portion at least one outlet configured to discharge the sand separated from the bentonite binder out of the drum, and at least one air exhauster at the first end portion of the drum configured to cause a non-heated air flow in a direction from the second end portion of the drum towards the first end portion of the drum to cool the sand separated from the bentonite binder.

2. The method as claimed in claim 1, wherein the thermally treated waste sand is subjected to mechanical treatment by at least grinding the waste sand.

3. A method of using sand reclaimed according to claim 1, comprising applying the reclaimed sand in a building industry product, in a foundry sand, or in a power plant boiler sand.

4. The method as claimed in claim 1, wherein the apparatus comprises at least one section configured to subject mechanical treatment to at least thermally treated waste sand to separate the sand from the bentonite binder.

5. The method as claimed in claim 4, wherein the at least one section is a grinding section configured to grind the at least thermally treated waste sand.

6. The method as claimed in claim 5, wherein the grinding section is at the first end portion of the rotating drum.

7. The method as claimed in claim 5, wherein the grinding section is at the second end portion of the rotating oven.

8. The method as claimed in claim 5, wherein the grinding section comprises grinding balls configured to subject impacts to the waste sand to separate the sand from the bentonite binder.

9. An apparatus for a reclamation of waste sand comprising bentonite binder, the apparatus comprising a rotating oven having a first end portion and a second end portion and at the first end portion at least one inlet configured to feed the waste sand into the oven and at the second end portion at least one outlet configured to discharge thermally treated waste sand out of the oven, a burner at the first end portion of the rotating oven configured to heat the waste sand fed into the oven to subject thermal treatment to the waste sand to burn carbon and evaporate absorbed moisture away from the bentonite binder, at least one lifter arranged to capture at least a portion of the waste sand fed into the oven to move with the oven on an inner circumference of the oven until the sand falls back towards a bottom of the oven, the at least one lifter also being arranged to guide the travel of the waste sand in the oven towards the second end portion of the oven and the at least one outlet at the second end portion of the oven, a rotating drum having a first end portion and a second end portion and at the first end portion at least one inlet configured to receive the at least thermally treated waste sand into the rotating drum and at the second end portion at least one outlet configured to discharge the sand separated from the bentonite binder out of the drum, and at least one air exhauster at the first end portion of the drum configured to cause a non-heated air flow in a direction from the second end portion of the drum towards the first end portion of the drum to cool the sand separated from the bentonite binder.

10. The apparatus as claimed in claim 9, wherein the rotating oven comprises at the second end portion at least one section configured to subject mechanical treatment to the thermally treated waste sand to mechanically separate the sand from the bentonite binder.

11. The apparatus as claimed in claim 10, wherein the at least one section is a grinding section comprising grinding balls subjecting impacts to the waste sand to separate the sand from the bentonite binder.

12. The apparatus as claimed in claim 9, wherein the at least one air exhauster is arranged to remove in the non-heated air flow fines from the sand separated from the bentonite binder.

13. The apparatus as claimed in claim 9, wherein the second end portion of the rotating drum comprises at least one classifying apparatus configured to classify the sand separated from the bentonite binder to at least one accept fraction and at least one reject fraction, the at least one accept fraction being dischargeable from the rotating drum through the at least one outlet of the drum.

14. The apparatus as claimed in claim 9, wherein the rotating drum comprises at least one magnetic separator configured to separate magnetic particles from the sand separated from the bentonite binder.

15. The apparatus as claimed in claim 9, wherein the rotating drum is arranged below the rotating oven substantially parallel with the rotating oven in a horizontal direction.

16. The apparatus as claimed in claim 9, further comprising at least one section configured to subject mechanical treatment to at least thermally treated waste sand to separate the sand from the bentonite binder.

17. The apparatus as claimed in claim 16, wherein the at least one section is a grinding section configured to grind the at least thermally treated waste sand.

18. The apparatus as claimed in claim 17, wherein the grinding section comprises grinding balls configured to subject impacts to the waste sand to separate the sand from the bentonite binder.

19. The apparatus as claimed in claim 16, wherein the rotating drum comprises at the first end portion at least one section configured to subject the mechanical treatment to the thermally treated waste sand to mechanically separate the sand from the bentonite binder.

20. The apparatus as claimed in claim 19, wherein the section configured to subject the mechanical treatment to the at least thermally treated waste sand at the first end portion of the rotating drum is a grinding section comprising grinding balls configured to subject impacts to the waste sand to separate the sand from the bentonite binder.

* * * * *